(12) United States Patent
Panem Jaya et al.

(10) Patent No.: US 11,317,472 B2
(45) Date of Patent: Apr. 26, 2022

(54) OPTIMIZED SELECTION OF USER PLANE NODE IN CUPS BASED 5G NSA OR EPC NETWORKS DURING UE RELOCATION

(71) Applicant: Cisco Technology, Inc., San Jose, CA (US)

(72) Inventors: Sanjeev Panem Jaya, Pune (IN); Dishant Mukesh Parikh, Nadiad (IN); Anand Arun Alshi, Pune (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/030,783

(22) Filed: Sep. 24, 2020

(65) Prior Publication Data

US 2022/0095420 A1 Mar. 24, 2022

(51) Int. Cl.
| | |
|---|---|
| *H04W 4/00* | (2018.01) |
| *H04W 88/16* | (2009.01) |
| *H04W 36/32* | (2009.01) |
| *H04W 48/18* | (2009.01) |
| *H04W 8/12* | (2009.01) |

(52) U.S. Cl.
CPC ............. *H04W 88/16* (2013.01); *H04W 8/12* (2013.01); *H04W 36/32* (2013.01); *H04W 48/18* (2013.01)

(58) Field of Classification Search
CPC ..... H04W 88/16; H04W 48/18; H04W 36/32; H04W 8/12
USPC ........................................................ 370/329
See application file for complete search history.

(56) References Cited

U.S. PATENT DOCUMENTS

| | | | | |
|---|---|---|---|---|
| 8,514,809 B2* | 8/2013 | Hwang | ............ | H04W 36/0022 370/331 |
| 8,578,035 B2* | 11/2013 | Miklos | ................. | H04W 36/12 709/228 |
| 9,220,110 B2* | 12/2015 | Rune | ................... | H04L 61/1511 |

(Continued)

FOREIGN PATENT DOCUMENTS

| | | |
|---|---|---|
| WO | 2017110650 A1 | 6/2017 |
| WO | 2019186504 A1 | 10/2019 |

OTHER PUBLICATIONS

Cisco System, Inc., "IP Routing: BFD Configuration Guide, Cisco IOS XE Release 3S (Cisco ASR 900 Series)", Jan. 8, 2020, 76 pages.

(Continued)

*Primary Examiner* — Amancio Gonzalez
(74) *Attorney, Agent, or Firm* — Edell, Shapiro & Finnan, LLC

(57) ABSTRACT

A method is performed by a mobility management entity (MME) in a network. Responsive to a session request from user equipment (UE), the MME initiates a session request procedure that includes: selecting a control plane serving gateway (SGW) and a user plane packet data network gateway (PGW) to establish a session for the UE; and receiving from the control plane SGW a session response to the session request, the session response including an identifier of the user plane PGW. After the session is established, responsive to a relocation request from the UE, the MME initiates a relocation procedure that includes: selecting a new control plane SGW; and sending to the new control plane SGW a new session request with the identifier of the user plane PGW, to cause the new control plane SGW to perform selecting the user plane PGW for the session in the relocation procedure.

20 Claims, 8 Drawing Sheets

(56) References Cited

U.S. PATENT DOCUMENTS

| | | | | |
|---|---|---|---|---|
| 9,392,529 | B2* | 7/2016 | Liu | H04L 41/0668 |
| 9,717,088 | B2* | 7/2017 | Reisslein | H04L 45/66 |
| 9,838,247 | B2* | 12/2017 | Liu | H04L 41/0668 |
| 10,015,712 | B2* | 7/2018 | Bi | H04W 36/10 |
| 10,069,791 | B2* | 9/2018 | Bhaskaran | H04W 76/22 |
| 10,701,743 | B2* | 6/2020 | Shan | H04W 76/12 |
| 10,735,308 | B2 | 8/2020 | Voit et al. | |
| 11,057,274 | B1* | 7/2021 | Kumar | H04L 41/0866 |
| 11,070,974 | B2* | 7/2021 | Dodd-Noble | H04L 61/1511 |
| 11,096,242 | B2* | 8/2021 | Atarius | H04M 15/66 |
| 11,102,683 | B2* | 8/2021 | Sillanpaa | H04W 36/14 |
| 2009/0129342 | A1* | 5/2009 | Hwang | H04W 36/0022 370/331 |
| 2013/0010756 | A1* | 1/2013 | Liang | H04W 36/18 370/331 |
| 2015/0223121 | A1* | 8/2015 | Keller | H04W 36/0022 370/331 |
| 2016/0183156 | A1* | 6/2016 | Chin | H04L 61/2007 370/331 |
| 2019/0335534 | A1* | 10/2019 | Atarius | H04L 65/1006 |
| 2020/0008054 | A1* | 1/2020 | Wifvesson | H04W 36/14 |
| 2020/0092759 | A1 | 3/2020 | Dasgupta et al. | |
| 2020/0204984 | A1 | 6/2020 | Dodd-Noble et al. | |
| 2021/0122261 | A1* | 4/2021 | Qiao | B60L 53/66 |
| 2021/0185585 | A1* | 6/2021 | Chen | H04W 36/0027 |
| 2021/0195490 | A1* | 6/2021 | Rommer | H04W 36/0022 |
| 2021/0345450 | A1* | 11/2021 | Atarius | H04W 28/0236 |

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.7.0 (Jul. 2020), 440 pages.

Cisco System, Inc., "MME Administration Guide, StarOS Release 21.17", updated Dec. 20, 2019, 125 pages.

* cited by examiner

OPTIMIZED SELECTION OF USER PLANE NODE IN CUPS BASED 5G NSA OR EPC NETWORKS DURING UE RELOCATION

TECHNICAL FIELD

The present disclosure relates to user equipment relocation across networks.

BACKGROUND

In control and user plane separation (CUPS) based 5G Non-standalone (NSA)/Evolved Packet Core (EPC) networks, 3rd Generation Partnership Project (3GPP) specifications allow for a serving gateway (SGW)-control plane (C) (SGW-C) to pass an SGW-user plane (U) (SGW-U) address selected by the SGW-C to a packet data network (PDN) gateway (PGW)-control plane (C) (PGW-C) as part of a session setup. This enables the PGW-C to select the same user plane if the user plane supports Sxa and Sxb combined functionality. Subscriber/user equipment (UE) may move out of a service area of the SGW-C into a different service area corresponding to a new SGW-C, which may include any of an intra mobility management entity (MME) handover, an inter MME handover, or an inter access type (e.g., a WiFi to LTE) handover from the SGW-C to the new SGW-C.

In the event of such a handover, there is no guarantee that the new SGW-C will select the same PGW-U as was used before the handover because the new SGW-C does not have address information for the initially selected PGW-U. This can result in two separate user plane nodes (e.g., SGW-U and PGW-U) in the data path for the subscriber/UE even though all of the user plane nodes support Sxa and Sxb combined functionality. This leads to suboptimal usage of user plane resources, and an additional hop in the data path of the subscriber/UE (and hence, increased latency), which can negatively affect a user experience.

DESCRIPTION OF EXAMPLE EMBODIMENTS

Overview

Figure 1:
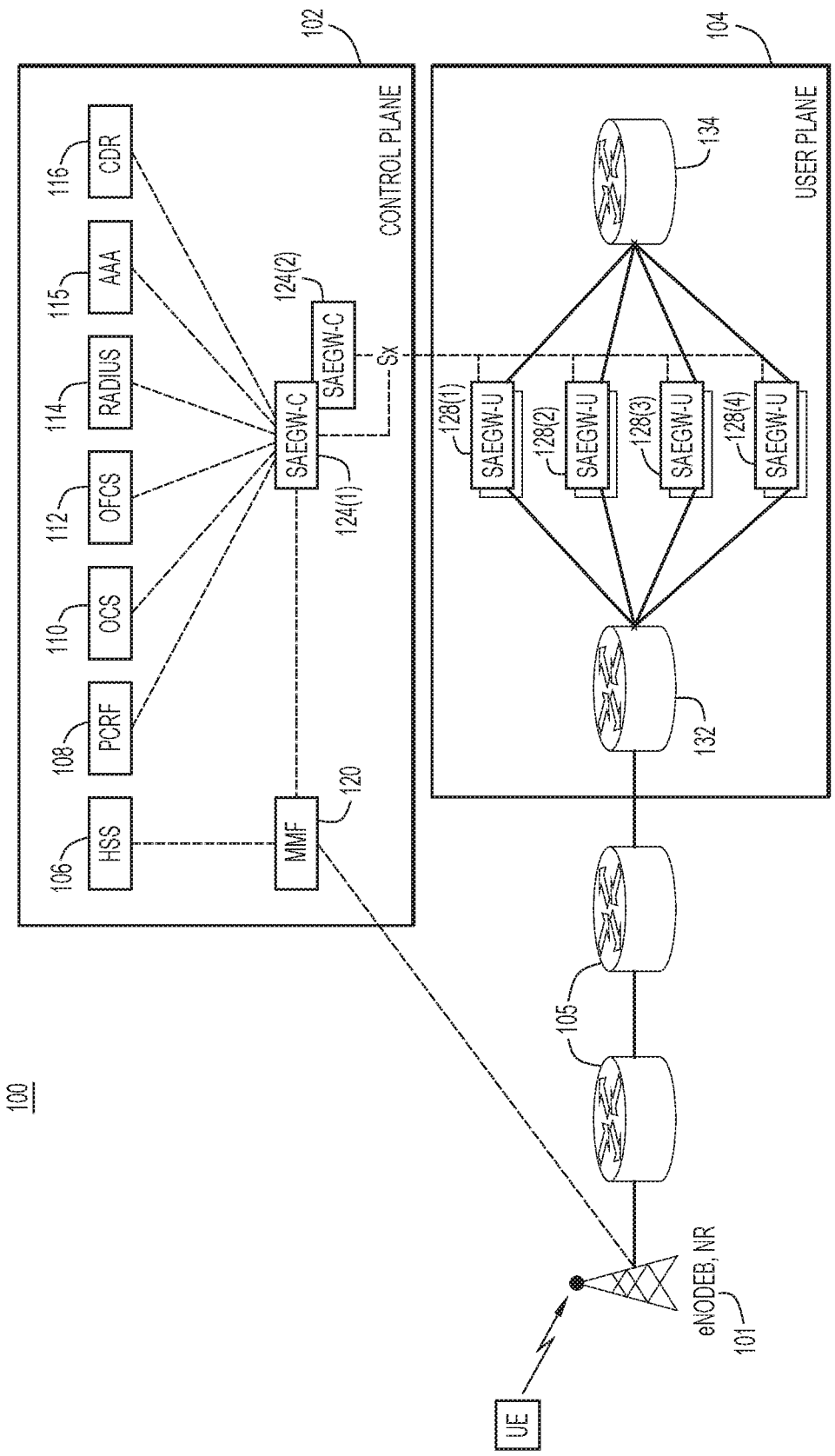
FIG. 1 is a block diagram of a high-level control and user plane separation (CUPS) based 5G non-standalone (NSA)/Evolved Packet Core (EPC) network, according to an example embodiment.

A method is performed by a mobility management entity in a network. Responsive to a session request from user equipment in a service area, the mobility management entity initiates a session request procedure that includes: selecting a control plane serving gateway for the service area and a user plane packet data network gateway (PGW) to establish a session for the user equipment; and receiving from the control plane serving gateway a session response to the session request, the session response including an identifier of the user plane PGW. After the session is established, responsive to a relocation request from the user equipment for a new service area, the MME initiates a relocation procedure that includes: selecting a new control plane serving gateway for the new service area; and sending to the new control plane serving gateway a new session request with the identifier of the user plane PGW, to cause the new control plane serving gateway to perform selecting the user plane PGW for the session in the relocation procedure, and ensure the same user plane PGW supports the session before and after the relocation request.

Example Embodiments

The System Architecture Evolution (SAE) is a core network architecture for 3GPP. A main component of the SAE is the EPC. The EPC employs, in part, SGWs, PGWs, and MMEs. The SGW is the interface towards a base station (e.g., evolved NodeB (eNodeB or eNB) and new radio (NR) interface). The SGW routes and forwards data packets from UE and acts as the mobility anchor during inter-eNodeB handovers. The PGW is the interface toward the PDN. The PGW provides connectivity from the UE to external PDNs by being the point of exit and entry of traffic for the UE. An SAEGW (also referred to as a "combined SAEGW" or a "combo SAEGW") is a logical combination of an SGW and a PGW. That is, the SGW and the PGW are logically paired in the combo SAEGW. The SAEGW supports all of the interfaces that the standalone or separate SGW and PGW support. An MME controls access to the network. The MME selects the SGW that will best serve a UE during an initial attach procedure for the UE, and during a handover involving relocation, described below.

A CUPS-based EPC separates the control plane and the user plane of the existing (non-CUPs) EPC. That is, with CUPS-based EPC, the existing SGW, PGW, and SAEGW are logically separated into SGW-C, PGW-C, and SAEGW-C for the control plane and SGW-U, PGW-U, and SAEGW-U for the user plane. The SAEGW-C (also referred to as a "combined SAEGW-C" or "combo SAEGW-C") is a combination of an SGW-C and a PGW-C, in which the SGW-C and the PGW-C are logically combined or paired together. Similarly, the SAEGW-U (also referred to as a "combined SAEGW-U" or "combo SAEGW-U) is a combination of an SGW-U and a PGW-U, in which the SGW-U and the PGW-U are logically paired or combined together.

Each of the above-mentioned gateways (e.g., SGW, SGW-C, SGW-U, PGW, PGW-C, PGW-U, SAEGW, SAEGW-C, and SAEGW-U) may also be referred to as a gateway "node" or a gateway "function" (e.g., "SGW-U node" or "SGW-U function," "SAEGW-U node" or "SAEGW-C function," and so on). For the purpose of conciseness only, the ensuing description generally omits the terms "node" and "function" when referring to the gateway. For example, an "SAEGW-U node" or "SAEGW-U function" is simply referred to as an "SAEGW-U," without any loss of generality in meaning.

With reference to FIG. 1, there is shown a block diagram of an example high-level CUPS based 5G NSA/EPC network 100. Network 100 includes an eNB 101 that provides an air interface to UE and through which the UE access the network, a control plane 102 that includes a signalling interface to the eNB, and a user plane 104 (also referred to as a data plane 104) separate from the control plane and that forwards data packets to/from the eNB through network devices 105 (e.g., routers) and to/from a packet data network (not shown).

Control plane 102 includes a Home Subscriber Service (HSS) 106, a Policy and Charging Rules Function (PCRF) 108, an Online Charging Server (OCS) 110, an Offline Charging Server (OFCS) 112, a Remote Authentication Dial-In User Service (Radius) server 114, an Authentication, Authorization, and Accounting (AAA) server 115, a Charging Data Record (CDR) server 116, an MME 120, a first SAEGW-C 124(1), and a second SAEGW-C 124(2) (collectively referred to as SAEGW-Cs 124) that communicate with each other over various signaling interfaces, such as the 3GPP defined set of signalling interfaces denoted "Sx" between the control plane and the user plane, for example. Although only two SAEGW-Cs are shown, there may be many more SAEGW-Cs in practice. Each SAEGW-C may be referred to as a "combo" control plane or combo SAEGW-C that includes both SGW-C and PGW-C functionality.

Data plane 104 includes parallel SAEGW-Us 128(1)-128(4) (collectively referred to as SAEGW-Us 128) that communicate with SAEGW-Cs 124 via various signaling interfaces of signaling interfaces Sx. Each SAEGW-U may be referred to as a combo user plane or combo SAEGW-U that includes both SGW-U and PGW-U functionality. During UE sessions, SAEGW-Us 128 forward data packets to/from eNB 101 through network device 132 and forward the data packets to/from the packet data network through network device 134.

Figure 2:
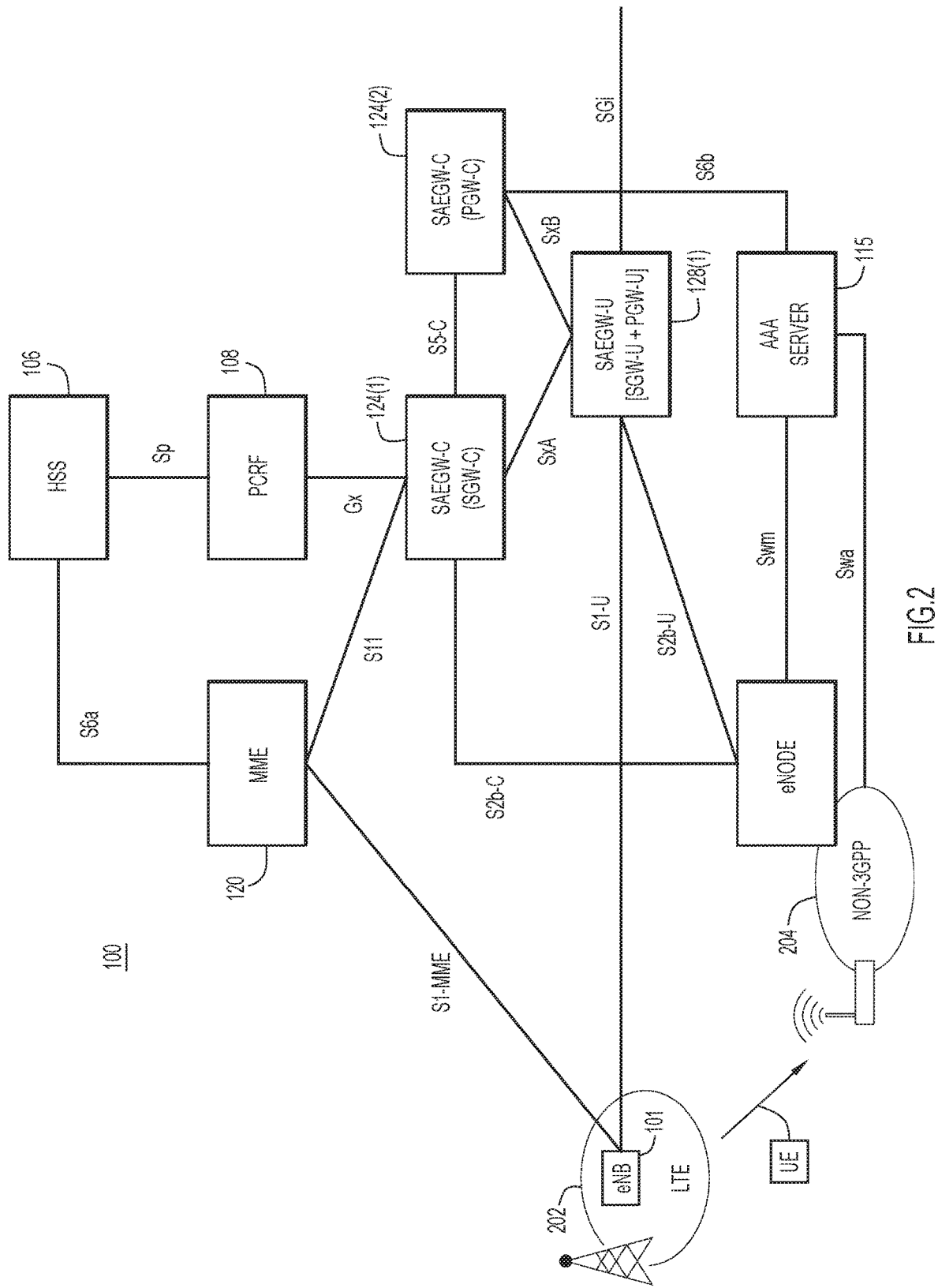
FIG. 2 is an illustration of user equipment (UE) relocation (i.e., the relocation of a UE session) in the network, according to an example embodiment.

With reference to FIG. 2, there is an illustration of UE relocation (i.e., the relocation of a UE session to a new SGW-C/SAEGW-C) in a portion of network 100 handled in accordance with embodiments presented herein. FIG. 2 also depicts specific signalling interfaces/functions between the various network nodes/functions of the network. When the UE registers for the first time in a service area through an LTE access network 202, MME 120 selects initial SAEGW-C 124(1) that matches the service area. In turn, initial SAEGW-C 124(1) selects initial SAEGW-U 128(1) to serve the UE, i.e., to handle forwarding of traffic in a session for the UE.

The UE relocates to new SAEGW-C 124(2) due to any of an intra MME, inter MME, or WiFi to LTE handover that results from a roam of the UE to new access network 204. Under conventional UE relocation processing, new SAEGW-C 124(2) would select a new SAEGW-U (i.e., a new user plane) independent of the earlier selection of initial SAEGW-U 128(1), which can result in extra hops in the data path used by the UE.

Accordingly, to avoid possibly introducing such extra hops in the data path, a relocation procedure according to the embodiments presented herein configures new SAEGW-C 124(2) to select the same SAEGW-U (i.e., initial SAEGW-U 128(1)) for the relocation as was used before the relocation, as is shown in FIG. 2 (which shows the final configuration after relocation). This results in use of the same, single user plane/SAEGW-U both before and after relocation, instead of different SAEGW-Us as occurs in the conventional scheme.

Figure 3:
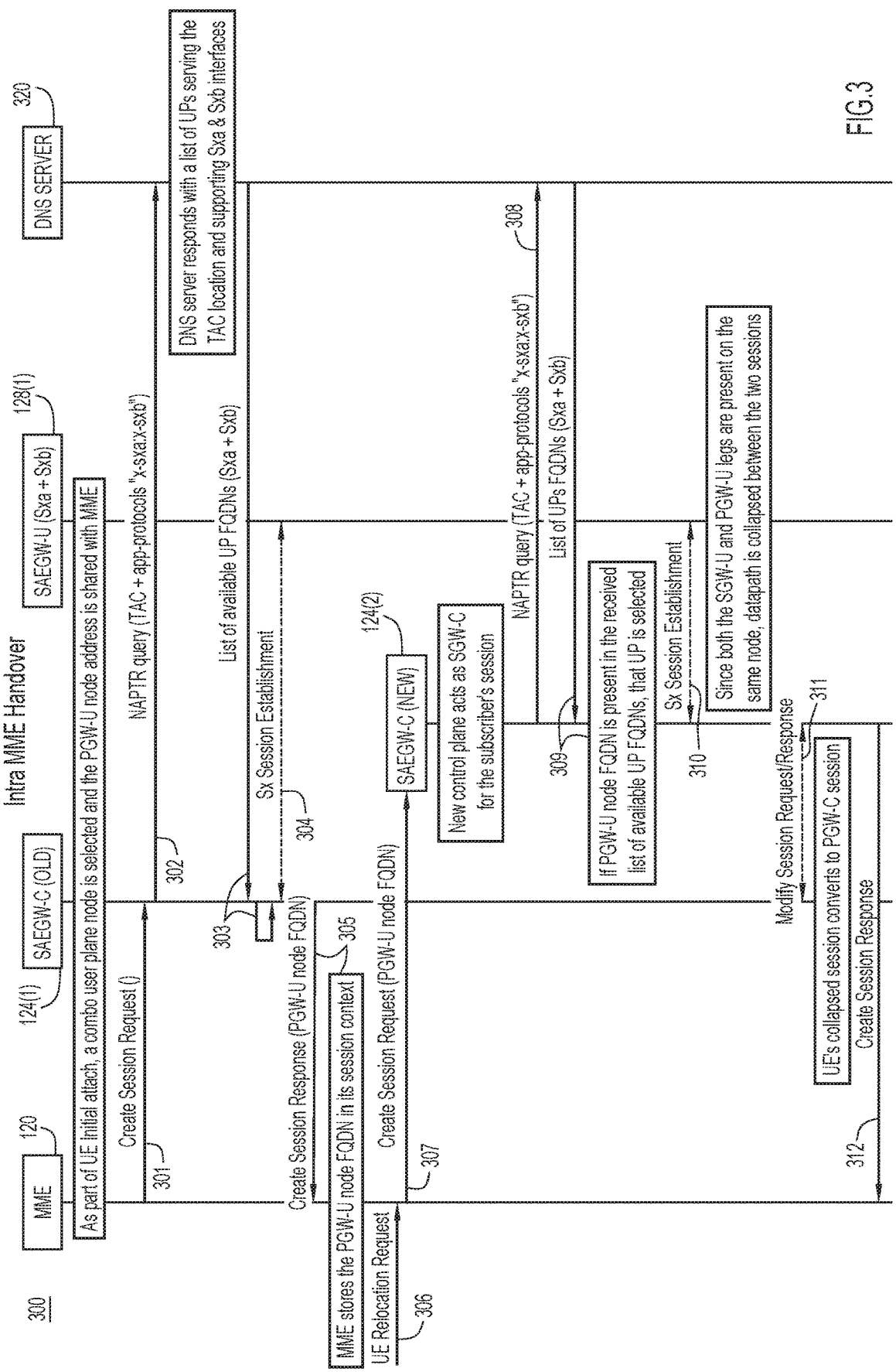
FIG. 3 is a transaction diagram for a relocation procedure (including, e.g., user plane selection) during an intra mobility management entity (MME) handover in the network, according to embodiments presented herein.

With reference to FIG. 3, there is an example call flow or transaction diagram 300 that shows a relocation procedure (including, e.g., user plane selection) during an intra MME handover in network 100, according to embodiments presented herein. The intra MME handover maintains the same MME throughout, changes the control plane SAEGW-C, but maintains the same user plane SAECW-U throughout.

At 301, MME 120 receives a UE attach request from UE in a service area. The attach request triggers or initiates a session request procedure to establish a session for the UE (see next operations 302-305). Responsive to receipt of the UE attach request, MME 120 selects an initial or "old" SAEGW-C based on the service area, and sends a create session request to the SAEGW-C. For example, MME 120 initially selects old SAEGW-C 124(1).

At 302, responsive to receiving the create session request from MME 120, the old SAEGW-C queries a Domain Name System (DNS) server 320 for the DNS for a list of identifiers of user plane SAEGW-Us that are available for the service area. For example, the old SAEGW-C sends to the DNS server 320 a Name Authority Pointer (NAPTR) query that includes (i) a Tracking Area Code (TAC) location associated with the service area, and (ii) identifiers of appropriate signaling interfaces/protocols to be supported (e.g., x-sxa: x-sxb).

At 303, responsive to the query, the DNS server 320 sends to the old SAEGW-C a list of identifiers/addresses of available SAEGW-Us serving the service area (e.g., the TAC location) and that support the interfaces, e.g., Sxa and Sxb. The identifiers of the available SAEGW-Us may include Fully Qualified Domain Names (FQDNs), for example. Responsive to receiving the list of available SAEGW-Us, the old SAEGW-C selects from the list an SAEGW-U to support a session with the UE. For example, the old SAEGW-C selects SAEGW-U 128(1).

At 304, the old SAEGW-C establishes the session for the UE with the selected SAEGW-U, e.g., SAEGW-U 128(1).

At 305, the old SAEGW-C sends to MME 120 a create session response that includes an additional custom field or information element (IE) populated with the identifier (e.g., FQDN) of the selected SAEGW-U (e.g., SAEGW-U 128(1)) used for the session. Upon receipt of the create session response, MME 120 stores the identifier (e.g., the FQDN) of the selected SAEGW-U into a record of a session context for the current UE session that is maintained at the MME.

At 306, after the session request procedure is completed and the session is established, MME 120 receives a relocation request initiated when the UE moves to a new service area that is best supported by a change in the SAEGW-C. This triggers or initiates a relocation procedure (see next operations 307-312)

At 307, responsive to receiving the relocation request, MME 120 selects a suitable new SAEGW-C (e.g., selects SAEGW-C 124(2)) corresponding to the new service area, i.e., serving the new area in which the UE is now located. MME 120 matches the request to the session context, and retrieves from the session context the identifier (e.g., FQDN) for the old SAEGW-U (e.g., SAEGW-U 128(1)). MME 120 initiates a new create session request toward the new SAEGW-C. That is, MME 120 sends to the new SAEGW-C a new create session request that includes the identifier of the old SAEGW-U in a new/custom IE of the create session request.

At 308, responsive to receiving the new create session request from MME 120, the new SAEGW-C queries the DNS server 320 for a list of identifiers of user plane SAEGW-Us that are available for the new service area, similar to operation 302 described above. For example, the new SAEGW-C sends to the DNS server 320 an NAPTR query that includes (i) a new TAC location associated with the new service area, and (ii) identifiers of appropriate functionalities to be supported (e.g., x-sxa:x-sxb).

At 309, responsive to the query, the DNS server 320 sends to the new SAEGW-C a list of identifiers/addresses (e.g., FQDNs) of available SAEGW-Us serving the new service area (e.g., the new TAC location) and that support the functionalities, e.g., Sxa and Sxb. Upon receiving the list of identifiers, the new SAEGW-C determines whether the identifier for the (old) SAEGW-U matches any identifier in the list of identifiers returned by the DNS server 320, i.e., whether the old identifier is in the list of identifiers. If there is a match, i.e. the identifier matches one of the identifiers in the list of identifiers, the new SAEGW-C selects the SAEGW-U having the matching identifier in the list of identifiers (i.e., selects old SAEGW-U 128(1)) to handle the session upon/after relocation.

At 310, the new SAEGW-C establishes/continues the session for the UE with the selected SAEGW-U. For example, the new SAEGW-C selects the old SAEGW-U and establishes/continues the session with that SAEGW-U. This ensures that both the SGW-U and the PGW-U legs of the session are co-located on the same combo SAEGW-U before and after the relocation/handover. The result is a minimum number of user plane hops in the data path for the session.

At 311, the old SAEGW-C and the new SAEGW-C exchange modify session request/response messages to update their local session contexts to reflect the relocation. This results in a collapsed UE session that converts to the common SAEGW-U.

At 312, the new SAEGW-C sends to MME 120 a create session response, which is received at the MME.

Figure 4A:
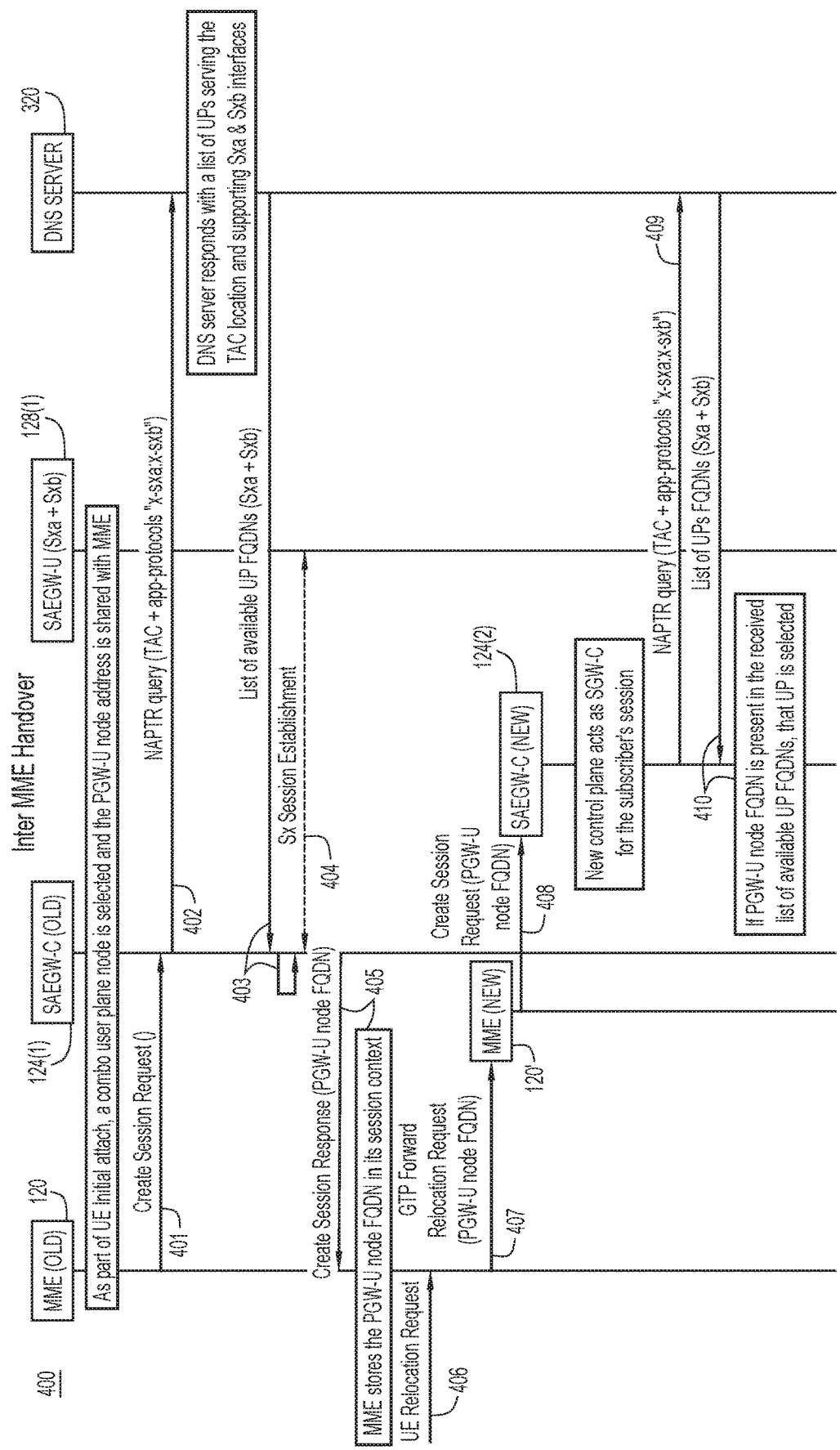
FIGS. 4A and 4B show a transaction diagram for a relocation procedure (including, e.g., user plane selection) during an inter MME handover in the network, according to an example embodiment.
Figure 4B:
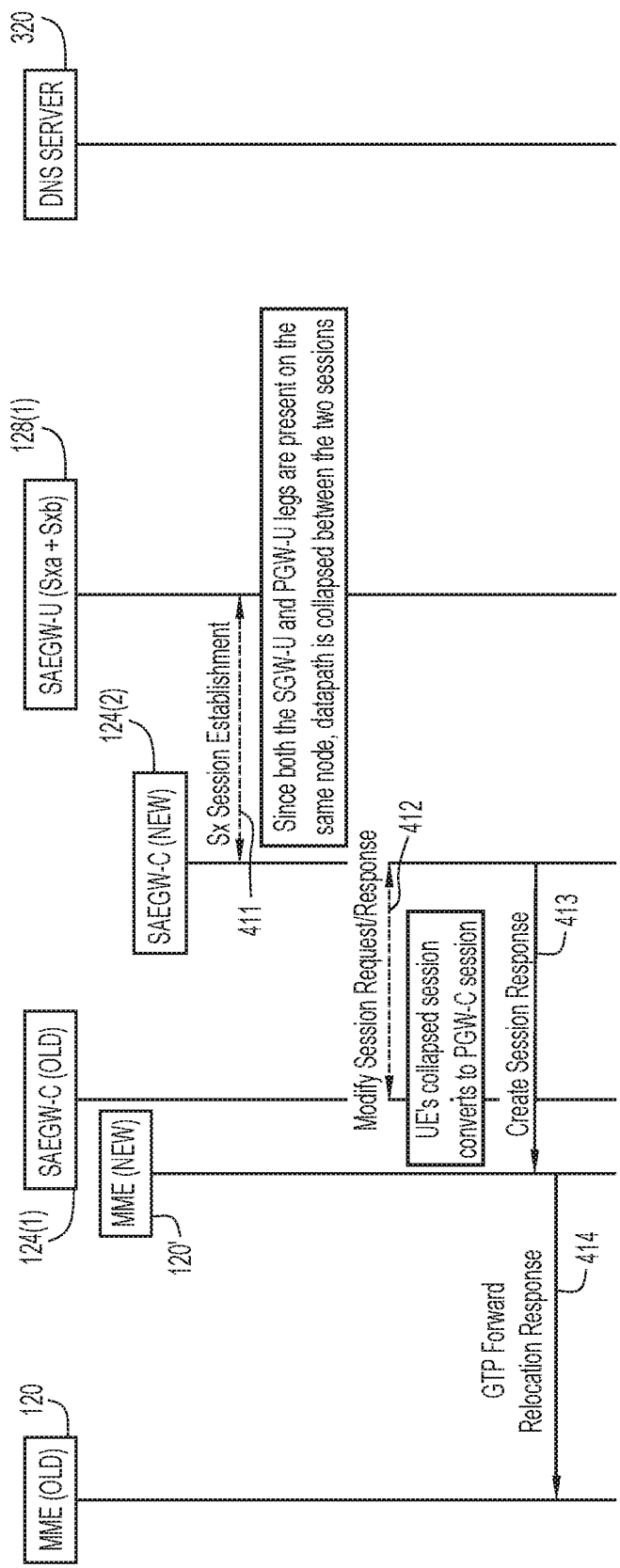

FIGS. 4A and 4B show a transaction diagram for an example relocation procedure 400 (including, e.g., user plane selection) during an inter MME handover in network 100, according to embodiments presented herein. The inter MME handover changes the MME (e.g., from an initial/old MME to a new MME), changes the control plane SAECW-C (e.g. from an initial/old SAEGW-C to a new SAEGW-C), but maintains the same user plane SAECW-U throughout.

With reference first to FIG. 4A, sequential operations/transactions 401-405 are substantially the same as respective operations 301-305 described above, except that MME 120 may be referred to as an initial/old MME.

At 406, old MME 120 receives a relocation request initiated when the UE moves to a new service area that requires changes to both the MME and the SAEGW-C.

At 407, responsive to receiving the relocation request, MME 120 (the current serving MME) matches the request to the session context, and retrieves from the session context the identifier (e.g., FQDN) for the old SAEGW-U (e.g., SAEGW-U 128(1)). MME 120 initiates a forward relocation request to a new MME (e.g., MME 120') that serves the new location of the UE. This forward relocation request may be a General Packet Radio Service (GPRS) Tunneling Protocol (GTP) forwarding location request, for example. The forward relocation request includes a new custom IE populated by MME 120 with the identifier of the SAEGW-U in current use (as retrieved from the session context by MME 120).

The new MME receives the forward location request and stores the identifier of the SAEGW-U currently in use to a local session context.

At 408, responsive to receiving the forward relocation request, the new MME selects a suitable new SAEGW-C (e.g., selects SAEGW-C 124(2)) corresponding to the new service area to which the UE has moved. The new MME retrieves from its session context the identifier for the SAEGW-U currently in use (e.g., SAEGW-U 128(1)). The new MME initiates a new create session request toward the new SAEGW-C, and includes in the request the identifier of the SAEGW-U currently in use, as described above in connection with operation 307.

At 409, responsive to receiving the new create session request from the new MME, the new SAEGW-C queries the DNS server 320 for a list of identifiers of user plane SAEGW-Us that are available for the new service area, similar to operation 308 described above.

Turning to FIG. 4B, next sequential operations/transactions 410, 411, 412, and 413 are substantially the same as respective operations/transactions 309, 310, 311, and 312, except that in operation 413, the new SAEGW-C directs the create session response to the new MME (e.g., MME 120') instead of old MME 120.

At 414, responsive to receiving the create session response from the new SAEGW-C, the new MME sends a (e.g., GTP) forward relocation response to old MME 120.

This ensures that both the SGW-U and the PGW-U legs of the session are co-located on the same combo SAEGW-U before and after the relocation/handover.

Transaction diagrams 300 and 400 depict networks that collapse separate SGW-C and PGW-C functions into a combo SAEGW-C function, by way of example. It is understood that the embodiments presented herein apply equally to networks that deploy separate SGW-C and PGW-C functions, and in which the user plane supports both Sxa and Sxb functionalities, e.g., as separate SGW-U and PGW-U functions. For that case, each SAEGW-C in transaction diagrams 300 and 400 may be replaced by a corresponding SGW-C (or SGW-C and PGW-C pair), and each SAEGW-U may be replaced by a corresponding PGW-U (or SGW-U and PGW-U pair). The following shows an example mapping of operations performed by the combo SAEGW-C and the separate SGW-C/PGW-C based on transaction diagrams 300 and 400:

a. SAEGW-C [PGW-C]: provides PGW-U FQDN in a create session response.

b. MME:
  i. Stores PGW-U FQDN for PDN context.
  ii. During handover procedure with SGW relocation, MME passes the stored PGW-U FQDN to the SGW-C as part of a create session request.

c. SAEGW-C [SGW-C]:
  i. Transparently passes PGW-U FQDN received in a create session response from PGW-C to MME during PDN establishment procedure.
  ii. Implements SGW-U/PGW-U selection logic based on PGW-U FQDN received from MME in the create session request.

Figure 5:
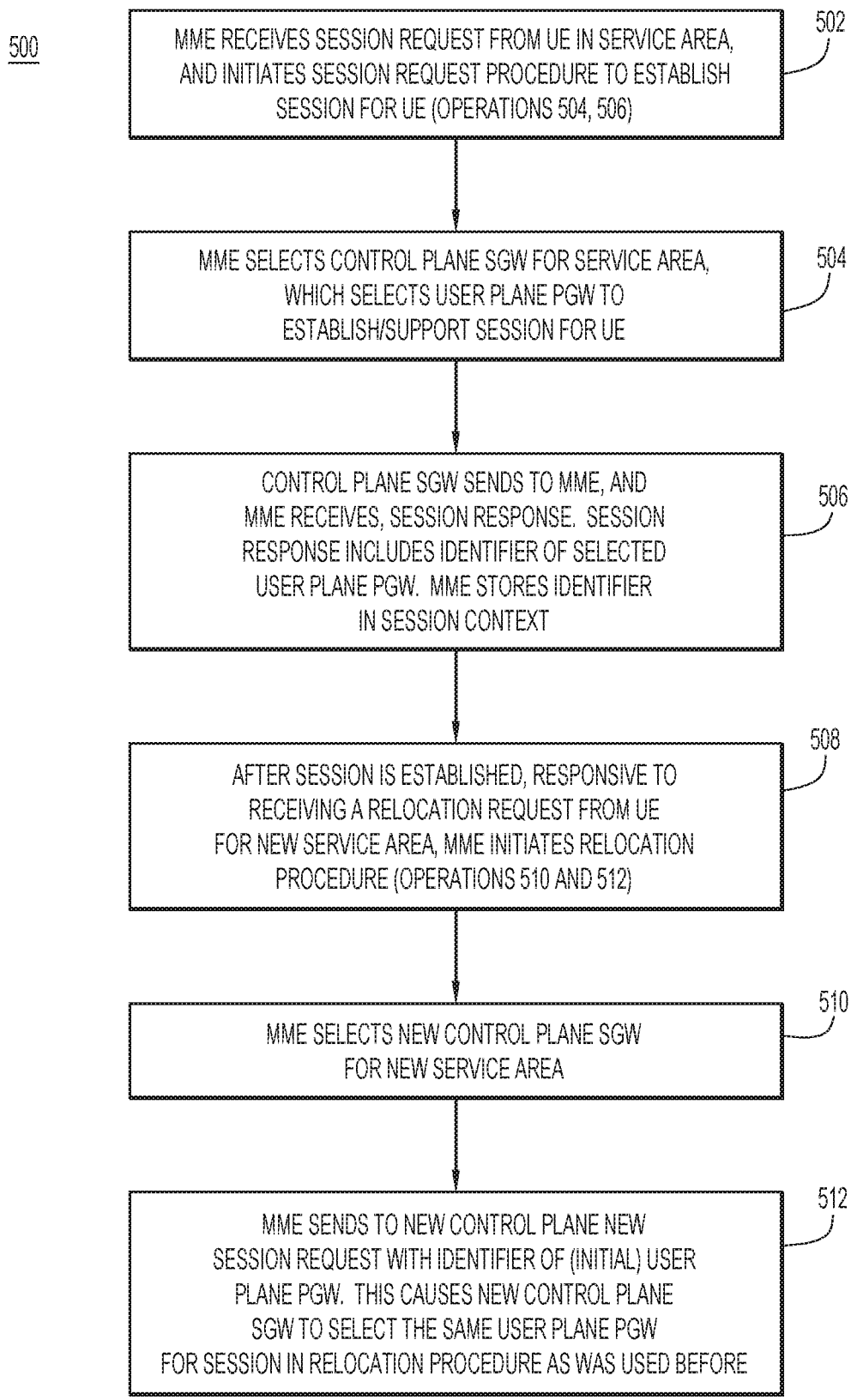
FIG. 5 is a flowchart of a method of performing an intra MME UE relocation (i.e., a relocation of a UE session involving an intra MME handover) in the network, according to an example embodiment.

With reference to FIG. 5, there is a flowchart of an example method 500 of performing an intra MME UE relocation (i.e., the relocation of a UE session involving an intra MME handover) in network 100. Operations of method 500 are performed primarily by an MME (e.g., MME 120) and multiple control plane SGWs.

At 502, the MME receives a session request from UE in a service area. Responsive to the request, the MME initiates a session request procedure to establish a session for the UE. The session request procedure includes next operations 504 and 506.

At 504, the MME selects an initial/old serving gateway (SGW) in a control plane (i.e., a "control plane SGW") for the service area to establish/support the session. In turn, the control plane SGW selects a packet data network gateway in a user plane (i.e., a "user plane PGW") for the session. The control plane SGW may include either a separate SGW-C or a combo SAEGW-C, and the user plane PGW may include a separate PGW-U or a PGW-U that forms part of a combo SAEGW-U.

At 506, the control plane SGW sends to the MME, and the MME receives from the control plane SGW, a session response to the session request. The session response includes an identifier of the user plane PGW selected by the control plane SGW. The MME stores the identifier in a local session context for subsequent retrieval.

At 508, after the session is established, responsive to receiving a relocation request from the UE for a new service area to which the UE has moved, the MME initiates a relocation procedure, including next operations 510 and 512.

At 510, the MME selects a new control plane SGW for the new service area. The new control plane SGW may include either a new separate SGW-C or a new combo SAEGW-C.

At 512, the MME sends to the new control plane SGW a new session request with the identifier of the user plane PGW. This causes the new control plane SGW to select the same user plane PGW for the session in the relocation procedure as was used before the relocation procedure. That is, operation 512 configures the new control plane SGW to select the same user plane PGW as was selected by the control plane SGW at operation 504.

To select the same user plane PGW, the new control plane SGW may (i) query a DNS server for identifiers of user plane PGWs available for the session, (ii) receive the identifiers from the DNS server determine whether the identifier of the (initial) user plane PGW is among the identifiers and, (iii) if the identifier of the user plane PGW is among the identifiers, select the user plane PGW for the session. On the other hand, if the identifier of the user plane PGW is not among the identifiers, the new control plane SGW selects a different user plane PGW from among the identifiers to handle the session after relocation.

An alternative embodiment includes an inter MME UE relocation (i.e., relocation of the UE session involving an inter MME handover). In the alternative embodiment, responsive to the relocation request, the MME performs a handover of the session to a new MME for the new service area. To do this, the MME forwards the relocation request to the new MME. The relocation request includes the identifier of the user plane PGW. In turn, the new MME selects the new control plane SGW, and sends to the new control plane SGW the new session request with the identifier of the user plane PGW. In turn, the new control plane SGW selects the same user plane PGW as before.

Figure 6:
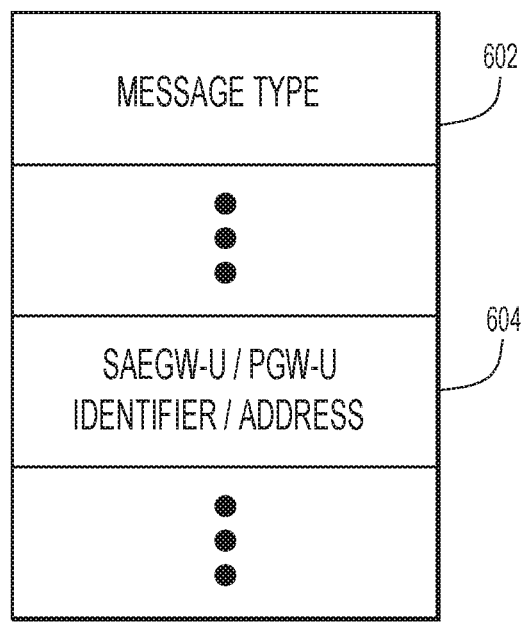
FIG. 6 is an illustration of a message including an identifier of a SAEGW-U or PGW-U in current use in a UE session, according to an example embodiment.

Referring to FIG. 6, there is an illustration of an example message 600 that carries an identifier of a PGW-U (e.g., for a separate PGW-U, or for a PGW-U that forms part of a combo SAEGW-U). Message 600 includes a message type 602 to indicate whether message 600 is a create session request, a create session response, or a forward relocation request, for example. Message 600 also includes an IE 604 populated with an identifier (e.g., FQDN) of a PGW-U node or combo SAEGW-U node.

Figure 7:
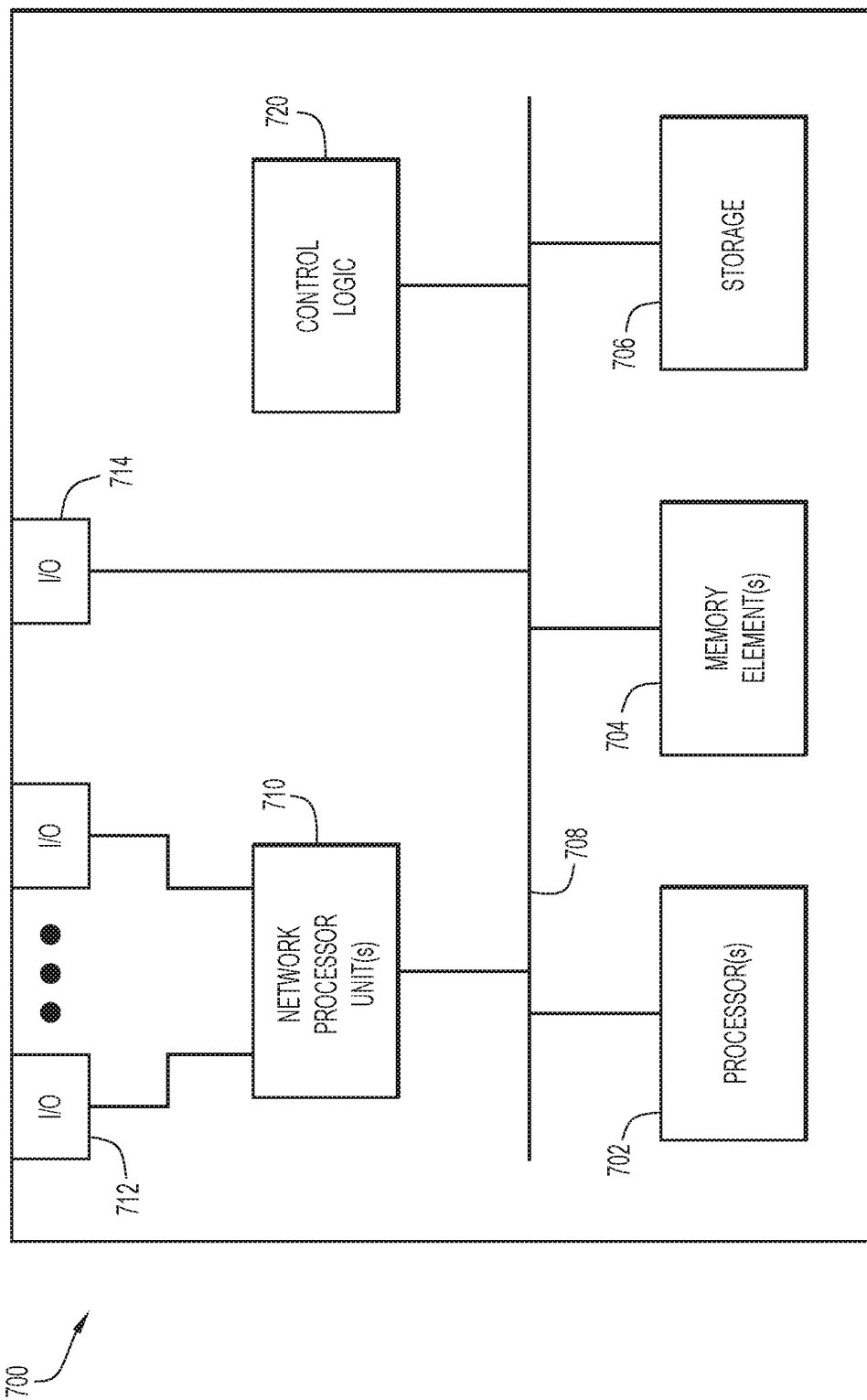
FIG. 7 is an illustration of a hardware block diagram of a computing device that may perform functions associated with operations for the embodiments presented herein, according to an example embodiment.

Referring to FIG. 7, there is an illustration of a hardware block diagram of a computing device 700 that may perform functions associated with operations for the embodiments presented herein. In various embodiments, a computing device, such as computing device 700 or any combination of computing devices 700, may be configured as any entity/entities as discussed for the techniques depicted in connection with FIGS. 1-6 in order to perform operations of the various techniques discussed herein. For example, computing device 700 may represent or implement an MME, an SGW, a PGW, an SGW-C/U, a PGW-C/U, a combo SAEGW-C, and/or a combo SAEGW-U.

In at least one embodiment, computing device may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory elements 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interfaces 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory elements 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In a CUPS based 5G NSA or EPC networks, a conventional UE relocation may result in two separate user plane function nodes (SGW-U and PGW-U) in the subscriber's data path resulting in un-optimized utilization of user plane resources, an additional hop in the data path (and hence, increased latency) adversely affecting an end user's experience. Accordingly, embodiments presented herein provide a mechanism by which a new SGW-C node can select the same user plane node as the PGW-U (if it supports Sxa and Sxb combo functionality) during a UE relocation in inter MME and intra MME handovers. The mechanism co-locates both SGW-U and PGW-U legs of the subscriber session during the UE relocation procedure, i.e., allows the subscriber's datapath to be collapsed on the user plane node resulting in elimination of an additional hop in the datapath for the subscriber, optimal utilization of user plane resources for the operator, and low latency in the datapath and, hence, improved end user experience.

In one aspect, a method is provided comprising: at a mobility management entity in a network, responsive to a session request from user equipment in a service area, initiating a session request procedure that includes: selecting a control plane serving gateway for the service area and a user plane packet data network gateway (PGW) to establish a session for the user equipment; and receiving from the control plane serving gateway a session response to the session request, the session response including an identifier of the user plane PGW; and after the session is established, responsive to a relocation request from the user equipment for a new service area, initiating a relocation procedure that includes: selecting a new control plane serving gateway for the new service area; and sending to the new control plane serving gateway a new session request with the identifier of the user plane PGW, to cause the new control plane serving gateway to perform selecting the user plane PGW for the session in the relocation procedure, such that the same user plane PGW supports the session before and after the relocation request.

In another aspect, an apparatus is provided comprising: network input/output interfaces configured to communicate with a network; and a processor of a mobility management entity, the processor coupled to the network input/output interfaces and configured to perform, responsive to a session request from user equipment in a service area, initiating a session request procedure that includes: selecting a control plane serving gateway for the service area and a user plane packet data network gateway (PGW) to establish a session for the user equipment; and receiving from the control plane serving gateway a session response to the session request, the session response including an identifier of the user plane PGW; and after the session is established, responsive to a relocation request from the user equipment for a new service area, initiating a relocation procedure that includes: selecting a new control plane serving gateway for the new service area; and sending to the new control plane serving gateway a new session request with the identifier of the user plane PGW, to cause the new control plane serving gateway to perform selecting the user plane PGW for the session in the relocation procedure.

In yet another aspect, a non-transitory compute readable medium is provided. The medium is encoded with instructions that, when executed by one or more processors, cause the one or more processors to perform: at a mobility management entity in a network, responsive to a session request from user equipment in a service area, initiating a session request procedure that includes: selecting a control plane serving gateway for the service area and a user plane packet data network gateway (PGW) to establish a session for the user equipment; and receiving from the control plane serving gateway a session response to the session request, the session response including an identifier of the user plane PGW; and after the session is established, responsive to a relocation request from the user equipment for a new service area, initiating a relocation procedure that includes: selecting a new control plane serving gateway for the new service area; and sending to the new control plane serving gateway a new session request with the identifier of the user plane PGW, to cause the new control plane serving gateway to perform selecting the user plane PGW for the session in the relocation procedure, such that the same user plane PGW supports the session before and after the relocation request.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a mobility management entity in a network, responsive to a session request from user equipment in a service area, initiating a session request procedure that includes:
      selecting a control plane serving gateway (SGW) paired with a control plane packet data network (PDN) gateway (PGW) for the service area and a user plane PGW paired with a user plane SGW to establish a session for the user equipment; and
      receiving from the control plane SGW a session response to the session request, the session response including an identifier of the user plane PGW; and
   after the session is established, responsive to a relocation request from the user equipment for a new service area, initiating a relocation procedure that includes:
      selecting a new control plane SGW paired with a new control plane PGW for the new service area; and
      sending to the new control plane SGW a new session request with the identifier of the user plane PGW, to cause the new control plane SGW to perform selecting the user plane PGW for the session in the relocation procedure, such that a same user plane PGW supports the session before and after the relocation request to ensure a minimum number of user plane hops for the session.

2. The method of claim 1, wherein the relocation procedure further includes, by the new control plane SGW:
   querying a Domain Name System (DNS) server for identifiers of user plane PGWs available for the session, and receiving the identifiers from the DNS server;
   determining whether the identifier of the user plane PGW is among the identifiers; and
   if the identifier of the user plane PGW is among the identifiers, selecting the user plane PGW for the session.

3. The method of claim 1, further comprising, at the mobility management entity:
   responsive to the receiving the session response including the identifier of the user plane PGW, associating the identifier with the session; and
   responsive to receiving the relocation request, accessing the identifier based on an identifier of the session in the relocation request.

4. The method of claim 1, wherein the relocation procedure further includes:
   performing a handover of the session from the mobility management entity to a new mobility management entity for the new service area, the handover including, by the mobility management entity, forwarding the relocation request to the new mobility management entity, wherein the relocation request includes the identifier of the user plane PGW; and
   by the new mobility management entity, performing the selecting the new control plane SGW and performing the sending to the new control plane SGW the new session request with the identifier of the user plane PGW.

5. The method of claim 1, wherein:
   the relocation request is for an intra mobility management entity handover.

6. The method of claim 1, wherein:
the control plane SGW is paired logically with the control plane PGW in a combined control plane System Architecture Evolution (SAE) gateway (SAEGW-C);
the new control plane SGW is paired logically with the new control plane PGW in a new combined control plane SAEGW-C; and
the user plane PGW is paired logically with the user plane SGW in a combined user plane SAEGW-U.

7. The method of claim 1, wherein the network includes a control and user plane separation (CUPS) based 5G network.

8. An apparatus comprising:
network input/output interfaces configured to communicate with a network; and
a processor of a mobility management entity, the processor coupled to the network input/output interfaces and configured to perform, responsive to a session request from user equipment in a service area, initiating a session request procedure that includes:
selecting a control plane serving gateway (SGW) paired with a control plane packet data network (PDN) gateway (PGW) for the service area and a user plane PGW paired with a user plane SGW to establish a session for the user equipment; and
receiving from the control plane SGW a session response to the session request, the session response including an identifier of the user plane PGW; and
after the session is established, responsive to a relocation request from the user equipment for a new service area, initiating a relocation procedure that includes:
selecting a new control plane SGW paired with a new control plane PGW for the new service area; and
sending to the new control plane SGW a new session request with the identifier of the user plane PGW, to cause the new control plane SGW to perform selecting the user plane PGW for the session in the relocation procedure, such that a same user plane PGW supports the session before and after the relocation request to ensure a minimum number of user plane hops for the session.

9. The apparatus of claim 8, wherein the processor is further configured to perform:
responsive to the receiving the session response including the identifier of the user plane PGW, associating the identifier with the session; and
responsive to receiving the relocation request, accessing the identifier based on an identifier of the session in the relocation request.

10. The apparatus of claim 8, wherein the relocation procedure further includes:
performing a handover of the session from the mobility management entity to a new mobility management entity for the new service area, the handover including, by the mobility management entity, forwarding the relocation request to the new mobility management entity, wherein the relocation request includes the identifier of the user plane PGW; and
by the new mobility management entity, performing the selecting the new control plane SGW and performing the sending to the new control plane SGW the new session request with the identifier of the user plane PGW.

11. The apparatus of claim 8, wherein:
the relocation request is for an intra mobility management entity handover.

12. The apparatus of claim 8, wherein:
the control plane SGW is paired logically with the control plane PGW in a combined control plane System Architecture Evolution (SAE) gateway (SAEGW-C);
the new control plane SGW is paired logically with the new control plane PGW in a new combined control plane SAEGW-C; and
the user plane PGW is paired logically with the user plane SGW in a combined user plane SAEGW-U.

13. The apparatus of claim 8, wherein the network includes a control and user plane separation (CUPS) based 5G network.

14. A one or more non-transitory computer readable media encoded with instructions that, when executed by one or more processors, cause the one or more processors to perform:
at a mobility management entity in a network, responsive to a session request from user equipment in a service area, initiating a session request procedure that includes:
selecting a control plane serving gateway (SGW) paired with a control plane packet data network (PDN) gateway (PGW) for the service area and a user plane PGW paired with a user plane SGW to establish a session for the user equipment; and
receiving from the control plane SGW a session response to the session request, the session response including an identifier of the user plane PGW; and
after the session is established, responsive to a relocation request from the user equipment for a new service area, initiating a relocation procedure that includes:
selecting a new control plane SGW paired with a new control plane PGW for the new service area; and
sending to the new control plane SGW a new session request with the identifier of the user plane PGW, to cause the new control plane SGW to perform selecting the user plane PGW for the session in the relocation procedure, such that a same user plane PGW supports the session before and after the relocation request to ensure a minimum number of user plane hops for the session.

15. The one or more non-transitory computer readable media of claim 14, wherein the relocation procedure further includes, by the new control plane SGW:
querying a Domain Name System (DNS) server for identifiers of user plane PGWs available for the session, and receiving the identifiers from the DNS server;
determining whether the identifier of the user plane PGW is among the identifiers; and
if the identifier of the user plane PGW is among the identifiers, selecting the user plane PGW for the session.

16. The one or more non-transitory computer readable media of claim 14, further comprising instructions to cause the one or more processors to perform, at the mobility management entity:
responsive to the receiving the session response including the identifier of the user plane PGW, associating the identifier with the session; and
responsive to receiving the relocation request, accessing the identifier based on an identifier of the session in the relocation request.

17. The one or more non-transitory computer readable media of claim 14, wherein the relocation procedure further includes:
performing a handover of the session from the mobility management entity to a new mobility management entity for the new service area, the handover including, by the mobility management entity, forwarding the relocation request to the new mobility management entity, wherein the relocation request includes the identifier of the user plane PGW; and by the new mobility management entity, performing the selecting the new control plane SGW and performing the sending to the new control plane SGW the new session request with the identifier of the user plane PGW.

18. The one or more non-transitory computer readable media of claim 14, wherein:

the relocation request is for an intra mobility management entity handover.

19. The one or more non-transitory computer readable media of claim 14, wherein:

the control plane SGW is paired logically with the control plane PGW in a combined control plane System Architecture Evolution (SAE) gateway (SAEGW-C);

the new control plane SGW is paired logically with the new control plane PGW in a new combined control plane SAEGW-C; and the user plane PGW is paired logically with the user plane SGW in a combined user plane SAEGW-U.

20. The one or more non-transitory computer readable media of claim 14, wherein the network includes a control and user plane separation (CUPS) based 5G network.

\* \* \* \* \*